United States Patent Office 3,212,577
Patented Oct. 19, 1965

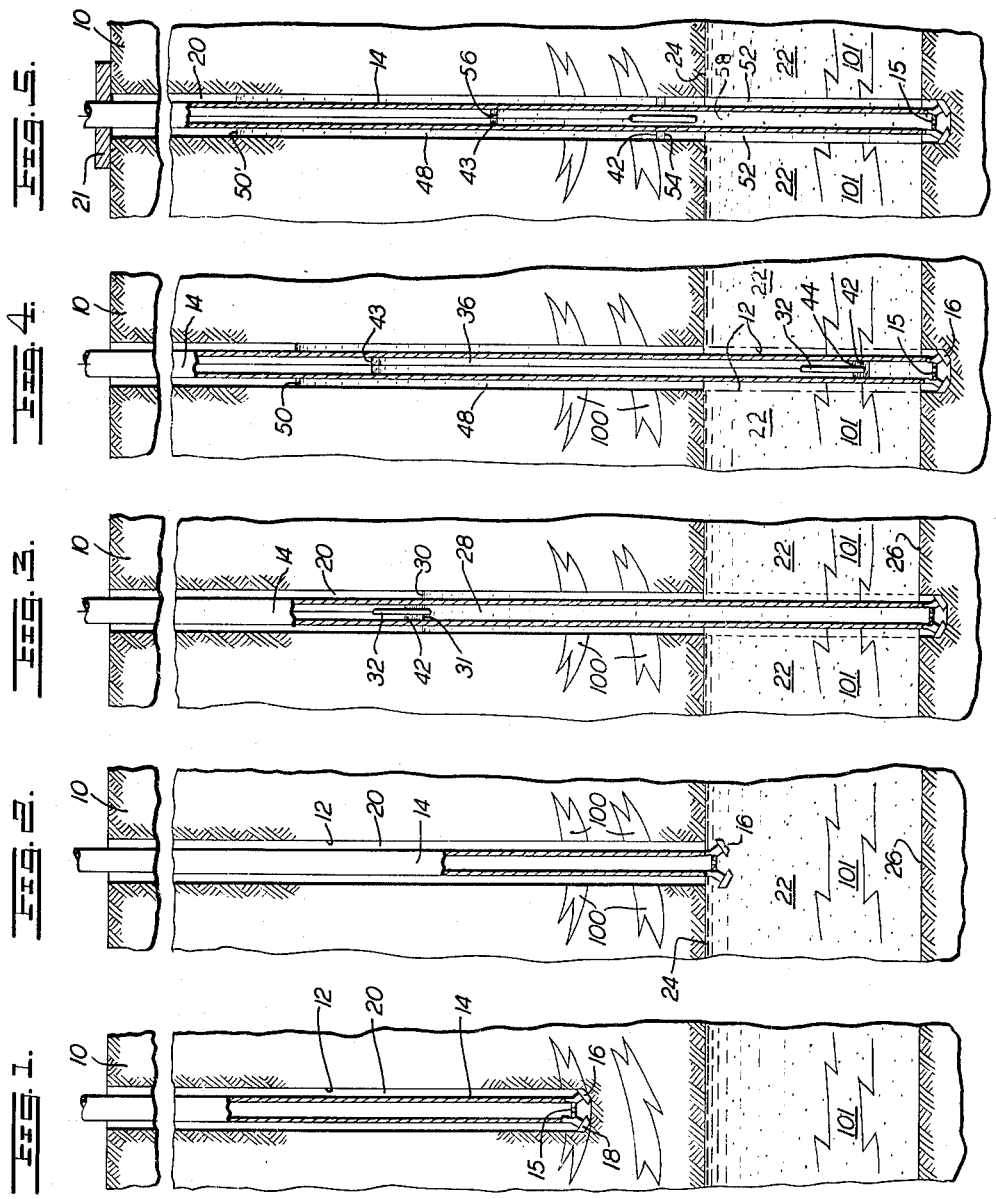

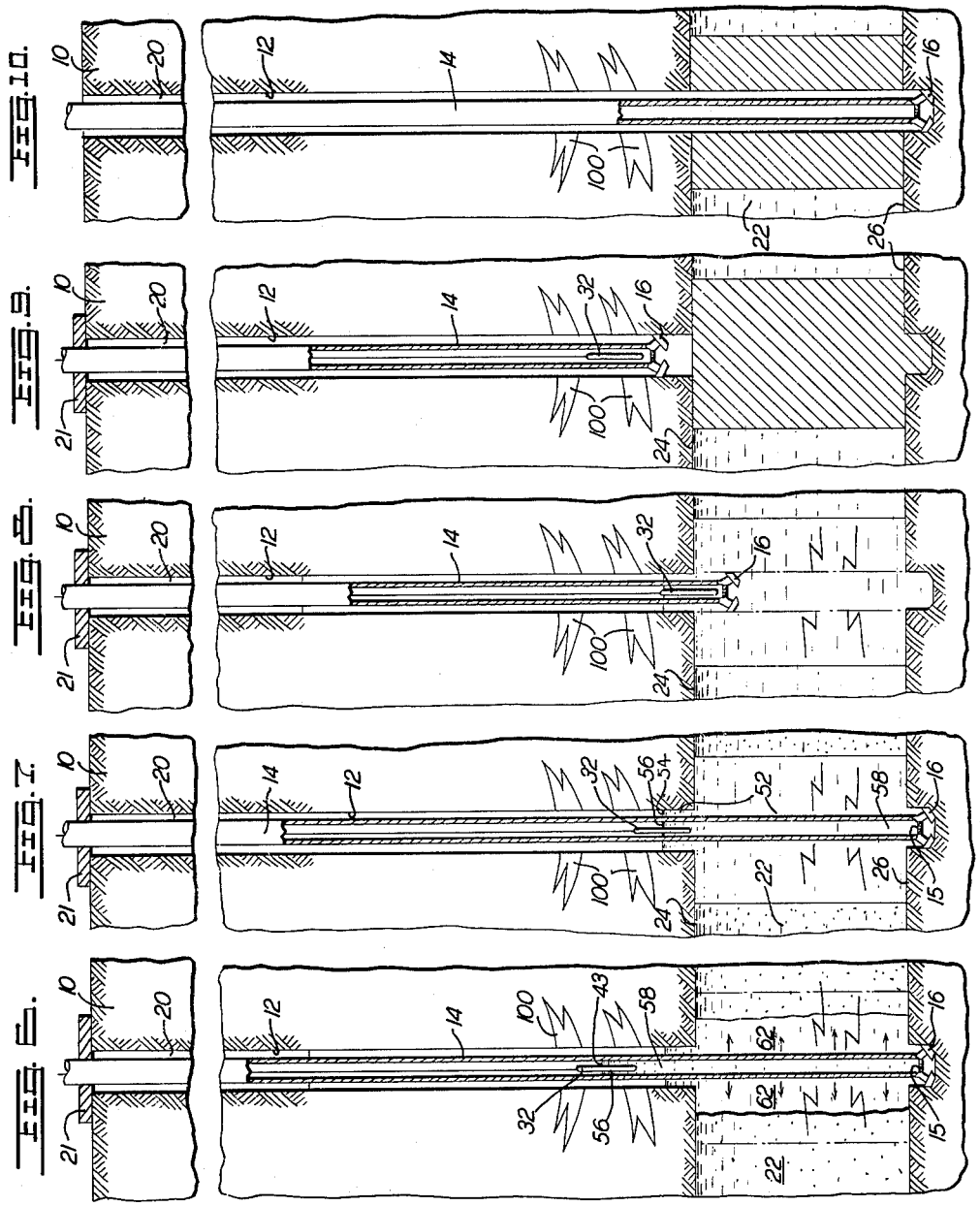

3,212,577
METHOD FOR DECREASING THE PERMEABILITY OF A PERMEABLE WELL AREA
Don R. Holbert and Robert O. Perry, Tulsa, Okla., assignors, by mesne assignments, to Sinclair Research, Inc., New York, N.Y., a corporation of Delaware
Filed July 9, 1959, Ser. No. 826,049
5 Claims. (Cl. 166—33)

This invention relates to weighted liquid resin-forming compositions and more particularly is concerned with compositions including alkylidine bisacrylamide, an ethylenic monomer and calcium chloride. These resin-forming materials have particular utility in the well treating field, e.g. processes which combat the obstruction of gas circulation in gas drilling wells through permeable subterranean formations and of the processes which partially or completely plug permeable subterranean well areas.

An oxidation-reduction catalytic polymerization system, e.g. an ammonium persulfate-nitrilotrispropionamide system has been added to the liquid resin-forming material near the well site prior to placing the material in the desired location within the well bore. The components of a catalytic system of this type are generally added in amounts to provide initiation of polymerization of the resin-forming material after a predetermined time, e.g. 30 to 90 minutes, has elapsed in order to provide sufficient working time for a proper placement of this material in the well bore. The polymerization of the material after placement in the proper position in the well bore should not be too slow such that any existing turbulences in the well bore will move the material out of position and thus critically curtail its sealing effect. Moreover, when using the resin-forming material in some well plugging processes, the material should be heavy enough to sink in the salt water and sit on the bottom of the well. Salt water generally has a specific gravity greater than 1, generally at least about 1.18. Thus, the resin-forming material should be sufficiently weighted such that it can be efficiently displaced into the permeable area before it can be dispersed by the salt water or fresh water if any be present. To reduce the chances of this happening, resin-forming materials having specific gravities greater than 1.18, preferably greater than 1.5 are desirable.

The present invention is directed to liquid resin-forming compositions suitable for use in the well-treating field in exhibiting advantageous specific gravity characteristics for use in processes employing such materials in well bores. This is accomplished by including significant amounts of calcium chloride in the compositions. Calcium chloride is highly desirable in this respect since unlike sodium chloride, for example, it will not precipitate or unduly prolong the induction period, i.e. the time required for the catalyst to produce enough free radicals to initiate the polymerization, particularly after the resin-forming material has been placed in position down the hole.

The liquid resin-forming compositions of the present invention are particularly suitable for use in the well bore treating field and include an aqueous solution of an alkylidene bisacrylamide, an ethylenic comonomer, and calcium chloride, the bisacrylamide having the formula:

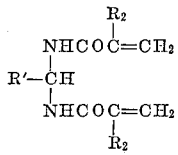

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e., contains at least the $>C=C<$ radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylene-bisacrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be use as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one $>C=C<$ group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

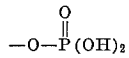

—OOCH; —OOCCH₃; —SO₃X, where X is H, NH₄, an alkali metal or an alkylamine; —CONR₂ and —CH₂CONR₂ where each R is hydrogen, alkylol, lower alkyl or a polyoxyalkylene radical; and —COOR' and —CH₂COOR', where R' is an H, NH₄, alkali metal, alkaline earth metal, organic nitrogenous base alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N-3-hydroxypropylacrylamide, dimethylamino-propylacrylamide, N-ethylol acrylamide; acrylonitrile; saturated alkyl esters of acrylic acid, i.e. methyl acrylate, $\beta$-hydroxyethyl acrylate; ethylene glycol and polyethylene glycol acrylates, an example being the reaction product of $\beta$-hydroxyethylacrylate or acrylic acid with about 1 to about 50 mols or more of ethylene oxide; salts of acrylic acid, i.e., magnesium acrylate, sodium acrylate, ammonium acrylate, zinc acrylate, $\beta$-amino-ethylacrylate, $\beta$-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, $\beta$-carboxyacrolein, butenoic acid; $\alpha$-chloroacrylic acid; $\beta$-chloroacrylic acid; as well as methacrylic acid and its corresponding derivatives.

Maleic acid and its corresponding derivatives including partial esters, partial salts, and ester salts therof; maleamic, chloromaleic, fumaric, itaconic, citraconic, vinyl sulfonic, and vinyl phosphonic acids and their corresponding derivatives and mixtures thereof can also be used. Derivatives of this kind and other suitable compounds include $\alpha,\beta$-dichloroacrylonitrile, methacrolein, potassium methacrylate, magnesium methacrylate, hydroxyethyl methacrylate, zinc $\beta$-chloroacrylate, trimethylamine methacrylate, calcium $\beta$-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di($\beta$-aminoethyl) maleate, di(methylaminoethyl) maleate, di(N,N'-dimethyl-$\beta$-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methylacetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinum chloride, and allyl trimethyl ammonium chloride to name only a few of the operative compounds.

The preferred resin-forming composition of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylenebisacrylamide and about 99 to 75 weight percent of acrylamide. The aqueous solution will usually include from about 5 weight percent of this mixture to its limit of solubility and preferably this amount is about 5 to 25 percent while the CaCl$_2$ will generally comprise from about 15 to 30 weight percent and preferably from about 25 to 30 weight percent on the basis of the water. Although the acrylamide as such is preferred, its nitrogen atom could be substituted as with a hydroxy methyl or a hydroxy ethyl group.

In addition to the above-mentioned ingredients, the compositions may include other components, particularly when they are destined for use down well holes, e.g. in processes for plugging permeable well areas. For instance, compounds exhibiting catalytic activity or other weighting agents may be added. Components exhibiting catalytic activity can be added prior to injection of the compositions in the well bore. Care must be exercised as to the amount of catalytic material added and this will depend upon the specific component employed, however, this amount should be such that sufficient working time is provided to permit displacement of the composition into the permeable area to be plugged before it hardens into the solid or semi-solid state. In general, the working life of the material at the temperatures and pressures encountered in the bore hole is such that it has a viscosity of up to about 10 to 15 centipoises, advantageously about 1 to 5 centipoises, at these conditions for at least about 15 minutes, and preferably for at least about 30 minutes. When referring to "working life" we mean the time which elapses after all essential ingredients for the formation of the solid or semi-solid plugging resin or plastic under the conditions of temperature and pressure found in the area of the well bore to be plugged have been added, for instance monomer, catalyst and promoter, e.g., a redox catalyst system, etc. A redox catalyst system generally includes an oxidizing agent, i.e. the catalyst, and reducing agent, i.e. promoter. The oxidizing component of the redox catalyst system can include for instance, any of the usual water-soluble peroxy catalysts derived from per-acids such as persulfuric, perchloric, perboric, and permanganic and their salts. For example, ammonium, potassium and sodium persulfates, hydrogen peroxide, the alkali metal and ammonium perchlorates, and the like may be employed. Among the reducing components that can be employed are the oxygen-containing sulfur compounds such as the alkali metal, e.g. sodium or potassium, bisulfites, and nitrilo-tris-propionamide. Examples of typical oxidizing agent-reducing agent combinations are sodium persulfate, potassium persulfate, or ammonium persulfate-nitrilotris-propionamide. Ammonium persulfate is an acceptable oxidation agent or catalyst to polymerize the aqueous mixture and it can be employed with a promoter or reducing agent such as sodium thiosulfate or nitrilo-tris-propionamide. The amounts of each of the catalyst and promoter usually are about 0.1 to 2 weight percent based on the aqueous solution of resin-forming material, and these amounts can be varied to give the desired working life. For instance, a weight ratio of catalyst to promoter of 1 to 2 in an aqueous solution containing 20 weight percent of the acrylamide and N,N'-methylenebisacrylamide (95 percent acrylamide and 5 percent N,N'-methylenebisacrylamide) will give a working life at 70° F. of about 60 to 120 minutes when the catalyst plus promoter is about 0.5 to 1.5 percent of the aqueous solution.

As to using the weighted composition in some well plugging processes, unless the material is heavy enough to sink below the salt water which has a specific gravity greater than 1, generally about 1.05 to 1.2, it must be quickly displaced into the permeable area before it can disperse into the salt water phase or an overlying fresh water layer, if any be present. To reduce the chances of this happening, weighted resin-forming materials of the present invention having advantageous specific gravities, e.g. greater than about 1.2, preferably greater than about 1.3 can be used. The specific gravity of the resin-forming material can be adjusted by the addition of varying amounts of calcium chloride. Suitable weighting agents which can be used in combination with calcium chloride include water-soluble, non-ionizing organic compounds, e.g. sugar and glycerol. The weighted compositions can be electrically conductive to distinguish it from other materials present in the well bore, for instance, brine. Accordingly, with the use of electrical conductivity detection means, the composition can be tracked and positioned at desirable locations in the well bore when employed in well plugging processes.

The compositions of the present invention can be used in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium.

According to this method, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, resin-forming material is introduced into a string of tubing extending downwardly below the permeable formation. The resinous material is conducted downwardly in the tubing. A first portion of the resinous material is conducted through the lower extremity of the tubing and forms a column in the annular space between the tubing and the wall of the well bore which column at least covers the formation to be sealed. The level of this annular column is maintained while the upper level of the remaining or secondary portion of the resinous material in the tubing is pressured to force permeable formation sealing amounts of resinous material into the permeable formation. The resinous material is maintained in this position until it substantially solidifies. The solid resin is drilled through and drilling is continued with gas circulation to remove cuttings from the well.

This material is of the type that will harden at temperatures encountered in the well bore, which in many cases are between about 50 to 200° F. The quantity of resin-forming material used must be adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is imperative that the resin-forming composition occupy the well bore adjacent the formation of ingress when the hardened resin is formed. Accordingly, after the introduction of the resin-forming composition, which has a specific gravity higher than the ingressing well fluid, into the well bore detection means are employed to track the upper level of the resin-forming composition, and gas or liquid, e.g. air or water pressure is applied to bring this upper level approximately adjacent the upper level of the strata of ingress, and the resinous composition is maintained in this position until it solidifies. Although air, other gas or liquid pressure can be employed in our method, air is preferable since (a) it permits better control of the resin-forming material, and (b) the well bore is drier following the polymerization of the resin-forming composition and no time must be spent drying the hole before drilling. The gas pressure will depend upon the nature of the obstruction encountered and the depth of the permeable formation; it is generally greater than about 150 p.s.i. but is usually about 150 to 1000 p.s.i. Since tremendous pressures can be required, it may be desirable to produce such pressures by employing liquid and gas in combination, e.g. provide a liquid column above the resin-forming composition and exert air pressure on the liquid column. Following solidification of the resinous composition, air-drilling is resumed. In the stinger arrangement the stinger itself can be used as an integral detection unit.

The following specific examples will serve to illustrate my invention but is not to be considered limiting.

EXAMPLE I

*Composition preparation*

To a liter of water under ambient conditions are added 10 weight percent (100 grams) of a resin-forming component including 95 percent of acrylamide and 5 percent of N,N'-methylenebisacrylamide, 25 weight percent (250 grams) calcium chloride. This resin-forming composition has a specific gravity higher than the specific gravity of salt water and a pH of 5.8, and is suitable, for example, for placement into a permeable subterranean well bore area. The weight percents throughout the specification, unless otherwise specified, are on the basis of water.

This composition is mixed with 0.25 gram of ammonium persulfate and 0.5 gram of nitrilo-tris-propionamide in 500 cc. of water and has an initial viscosity (1.3 centipoises) approximating that of water (which is about 0.5 to 1.5 centipoises under the conditions in many well bores) and is not greater than about 2.0 centipoises over its working life to facilitate its placement in the desired well area. At a temperature of 100° F., it polymerizes in 9 minutes.

EXAMPLE II

The compositions of this invention as used in an air-drilling method can best be described with reference to a specific example and the drawing, FIGURES 1 through 10, in which several distinct phases of the method are illustrated.

Referring to the drawing, FIGURE 1, the numeral 10 represents the earth's surface through which a well bore 12 is being drilled to an oil-producing formation with rotary drill pipe 14 containing a rotary bit 16 at the lower end. Pressurized air is introduced into drill pipe 14 at the surface of the earth, is conducted downwardly therein, exits through opening 15 of rotary drill bit 16 at the site or formation of drilling 18, and passes upwardly through annulus 20, surrounding drill pipe 14, carrying relatively small as well as larger rock particles from the site of drilling to the earth's surface.

In FIGURE 2 rotary drill bit 16 passes through crevices 100, and penetrates a salt water formation 22 at its upper level 24 as indicated by a reduction in air circulation as well as the muddy nature of the particles recovered from the site of drilling. The depth of the drill bit is noted and thus the position of upper level 24 of salt water formation 22 is known. In FIGURE 3 drilling is continued through the salt water-bearing formation containing crevice 101, air circulation eventually ceases due to the back pressure of the salt water, a column of salt water 28 rises in the well bore and drill pipe to level 30 in annulus 20 and upper level 31 in drill pipe 14, the lower level 26 of salt water formation 22 is penetrated by rotary drill bit 16 and drilling is discontinued. Occasionally, in cases where the water formation is of considerable depth, it may not be possible to penetrate the lower level of the formation before water production stops further drilling.

A small amount, e.g. 10 gallons, of radioactive fluid, e.g. aqueous iodine 131 solution is injected into drill pipe 14 and is shown at position 42. A detecting device 32 consisting essentially of a Geiger-counter is inserted to locate the radioactive fluid.

In FIGURE 4 gas pressure is applied to the liquid column in drill pipe 14 to move the upper level 44 of the column of radioactive liquid 42 downwardly in the drill pipe to the position shown. As the column moves downwardly salt water exits through opening 15 of rotary drill bit 16 and forms annular salt water column 48 with an upper level 50 in the annular space formed between the drill pipe and the walls of the well bore. An amount of resinous material at least sufficient to cover the portions of formation 22 exposed to well bore 12, for instance, fifty gallons of resinous material, weighted, e.g. with 25% CaCl₂, to be heavier than the salt water in the well bore, consisting essentially of 20 weight percent of a mixture of 5% N,N'-methylene-bis-acrylamide and 95% acrylamide, and 25% CaCl₂ in water, along with 0.3 weight percent of ammonium persulfate and 0.6 weight percent of nitrilo-tris-propionamide is injected down drill pipe 14 at a rate of 2 gallons per minute and positioned in tubular area 36 located above upper level 44 of the radioactive liquid. Detecting device 32 is used to locate the position of radioactive liquid 42. A second radioactive isotope layer 43, e.g. of iodine 131, is added on top of the resinous material.

In FIGURE 5 pressurized air is introduced downwardly in drill pipe 14 and moves the resinous material, preceded by radioactive material 42, through opening 15 and up the annulus formed between the drill pipe and the well bore walls to form an annular column of resinous material 52 (with an upper level 54) covering the portions of salt water formation 22 exposed in the well bore. In this operation, the pressure of the resinous material is sufficient to force a significant quantity into the adjacent formation and the resinous material displaces annular salt water column 48 upwardly to new level 50'. As the annular resinous material column 52 is moved upwardly, radioactive material 42 is located, thus upper level 54, with device 32 which is located within drill pipe 14, to insure upward movement of upper level 54 of the resinous material at least adjacent and preferably a short distance beyond the upper level 24 of salt water formation 22. By noting the depth of the device 32 the position of upper level 54 is known. Annulus 20 is sealed at the surface with casing head 21 and air pressure up to the limit of the surface casing is used to maintain upper level 54 of annular column of resinous material 52 in the position shown. Detecting device 32 is raised (not shown) to locate layer 43 thus upper level 56 of the secondary column (tubular) of resinous material 58.

In FIGURE 6 pressurized air (250 p.s.i.) is introduced downwardly in drill pipe 14 and forces resinous material through opening 15 and causes the simultaneous injection of resinous material in area 62 into the entire portion of permeable formation 22 exposed in the well bore as shown by the indicating arrows. During this phase layer 43 thus upper level 56 of resinous material tubular column 58 is tracked with device 32.

In FIGURE 7 the displacement of resinous material by air is discontinued when the upper level 56 of resinous material tubular column 58 is approximately even with upper level 54 of annular resinous material column 52 as determined by observing the depth of tracking device 32 and discontinuing the displacement when the device 32 reaches the depth priorly noted for upper level 54. In FIGURE 8 the drill pipe and bit are lifted as shown. The well is shut in and the resinous materials maintained in this position by regulating the air pressure in both the annulus and drill pipe until the resinous material commences to polymerize. However, the drill pipe can be raised above the resinous material before polymerization time and solidification of the resin as shown in FIGURE 9. The resinous material is copolymerized to a semi-solid gel in about 90 minutes although copolymerization time can be controlled by changing the concentration of the catalyst or by adding small amounts of potassium ferricyanide to delay polymerization. In FIGURE 10, following the solidification of the resinous material, air pressure is discontinued, detection device 32 is removed, the salt water is blown out, air circulation down drill pipe 14 to rotary drill bit 16 is initiated, drilling is resumed, the solidified resinous material is drilled-through, and the drilling continues downwardly into the earth's surface while removing cuttings from the well bore by air circulation down the drill pipe and up the well annulus.

It is claimed:

1. A method for combatting the obstruction of gas circulation in drilling wells employing gas as the circulation medium, wherein the obstruction results from the ingress of extraneous materials into the well bore, the steps comprising introducing a weighted aqueous solution of a resinous material into a string of tubing extending downwardly in the well bore below the upper level of the formation of ingress, conducting a portion of the resinous material through the tubing to form an annular column of resinous material covering the formation of ingress in the annular space provided between the tubing and the portion of the formation of ingress exposed in the well bore, simultaneously maintaining the upper level of the annular resinous material column at the approximate depth of the upper level of the formation of ingress while applying pressure to the resinous material remaining in the tubing to force formation sealing amounts of resinous material into the portion of the formation of ingress exposed in the well bore, maintaining the resinous material in this position until it polymerizes substantially solidifies, drilling through the polymerized solidified resin, and continuing drilling with gas circulation to remove cuttings from the well; said resinous material consisting essentially of water and from about 5 percent to its limit of solubility of a mixture of (a) about 1 to 25 weight percent of a monomeric alkylidene bisacrylamide of the formula

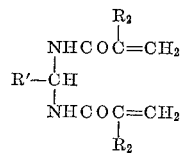

in which

is a hydrocarbon residue of an aldehyde containing from about 1 to 10 carbon atoms and R₂ is of the group consisting of hydrogen and methyl and (b) about 75 to 99 weight percent of another ethylenic monomer copolymerizable with (a), said aqueous composition including from about 15 to 30 weight percent of calcium chloride based on the water.

2. A method for decreasing the permeability of a permeable well area in a well containing, the steps comprising introducing a weighted aqueous solution of a resin-forming material consisting essentially of water and from about 5 percent to its limit of solubility of a mixture of (a) about 1 to 25 weight percent of a monomeric alkylidene bisacrylamide of the formula

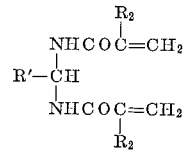

in which

is a hydrocarbon residue of an aldehyde containing from about 1 to 10 carbon atoms and R₂ is of the group consisting of hydrogen and methyl and (b) about 75 to 99 weight percent of another ethylenic monomer copolymerizable with (a), said aqueous composition including from about 15 to 30 weight percent of calcium chloride, based on the water, into the permeable well area to set therein to decrease the permeability of the area.

3. The method of claim 2 wherein the bisacrylamide is N,N'-methylenebisacrylamide and the ethylenic monomer is acrylamide.

4. The method of claim 3 wherein the permeable well area is providing extraneous materials into the well bore during a gas drilling operation to obstruct gas circulation and decreasing the permeability of the area combats this obstruction.

5. A method for combatting the obstruction of gas circulation in drilling wells employing gas as the circulation medium, wherein the obstruction results from the ingress of extraneous materials into the well bore, the steps comprising introducing a weighted aqueous solution of a resinous material into a string of tubing extending downwardly in the well bore below the upper level of the formation of ingress, conducting a portion of the resinous material through the tubing to form an annular column of resinous material covering the formation of ingress in the annular space provided between the tubing and the portion of the formation of ingress exposed in the well bore, simultaneously maintaining the upper level of the annular resinous material column at the approximate depth of the upper level of the formation of ingress while applying pressure to the resinous material remaining in the tubing to force formation sealing amounts of resinous material into the portion of the formation of ingress exposed in the well bore, raising the tubing above the resinous material, maintaining the resinous material in this position until it polymerizes and substantially solidifies, drilling through the polymerized solidified resin, and continuing drilling with gas circulation to remove cuttings from the well; said resinous material consisting essentially of water and from about 5% to its limit of solubility of a mixture of (a) about 1 to 25 weight percent of a monomer, i.e. alkylidene bisacrylamide of the formula

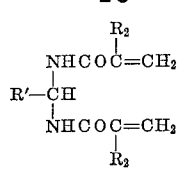

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a), said aqueous composition including from about 15 to 30 weight percent of calcium chloride based on the water.

References Cited by the Examiner

UNITED STATES PATENTS

| | | | |
|---|---|---|---|
| 2,726,063 | 12/55 | Ragland et al. | 255—1.8 |
| 2,738,163 | 3/56 | Shields | 255—1.8 |
| 2,801,984 | 8/57 | Morgan et al. | 260—41 |
| 2,805,722 | 9/57 | Morgan | 166—35 |
| 2,850,487 | 9/58 | D'Alelio | 260—80.3 |
| 2,851,445 | 9/58 | Bloch | 260—80.3 |
| 2,940,729 | 6/60 | Rakowitz | 166—33 |
| 3,011,547 | 12/61 | Holbert | 166—33 |

CHARLES E. O'CONNELL, *Primary Examiner.*

NORMAN YUDKOFF, *Examiner.*